United States Patent
Niemela

(10) Patent No.: US 8,346,244 B2
(45) Date of Patent: Jan. 1, 2013

(54) METHOD AND DEVICE FOR TESTING A MOBILE STATION'S CAPABILITY OF PROCESSING AT LEAST ONE SECOND CHANNEL AND COMMUNICATION SYSTEM COMPRISING SUCH DEVICE

(75) Inventor: Kari Juhani Niemela, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 1 day.

(21) Appl. No.: 12/935,337

(22) PCT Filed: Mar. 31, 2008

(86) PCT No.: PCT/EP2008/053804
§ 371 (c)(1),
(2), (4) Date: Jan. 4, 2011

(87) PCT Pub. No.: WO2009/121391
PCT Pub. Date: Oct. 8, 2009

(65) Prior Publication Data
US 2011/0103447 A1 May 5, 2011

(51) Int. Cl.
*H04Q 7/20* (2006.01)
(52) U.S. Cl. ............... 455/423; 455/450; 455/550.1; 370/329
(58) Field of Classification Search .............. 455/423, 455/450, 550.1; 370/329
See application file for complete search history.

(56) References Cited

U.S. PATENT DOCUMENTS

| | | | |
|---|---|---|---|
| 7,471,702 B2 * | 12/2008 | Laroia et al. | 370/491 |
| 7,590,389 B2 * | 9/2009 | Anderson | 455/67.7 |
| 7,616,961 B2 * | 11/2009 | Billhartz | 455/452.2 |
| 7,826,807 B2 * | 11/2010 | Laroia et al. | 455/102 |
| 8,095,091 B1 * | 1/2012 | Kopikare | 455/127.1 |

FOREIGN PATENT DOCUMENTS

| | | |
|---|---|---|
| EP | 1 806 949 A1 | 7/2007 |
| WO | WO 99/50989 | 10/1999 |

OTHER PUBLICATIONS

3GPP TSG GERAN #33, Tdoc GP-070214, "Voice Capacity Evolution with Orthogonal Sub Channel", Seoul, South Korea, Feb. 12-16, 2007, Source: Nokia, 8 pgs.

Sampei, S., et al., "Adaptive Modulation/TDMA Scheme for Large Capacity personal Multi-Media Communication Systems", 2334b IEICE Transactions on Communications, E77-B(1994), No. 9, Tokyo, Japan, Sep. 9, 1994, pp. 1096-1103.

* cited by examiner

*Primary Examiner* — Nhan Le
(74) *Attorney, Agent, or Firm* — Harrington & Smith

(57) ABSTRACT

A method and a device are provided for testing a mobile station's capability of processing at least two channels in a resource unit is provided, wherein a base station provides a test message to the mobile station; wherein the mobile station's capability of processing the at least two channels is determined based upon the mobile station's feedback. Further, a communication system comprising such a device is suggested.

18 Claims, 1 Drawing Sheet

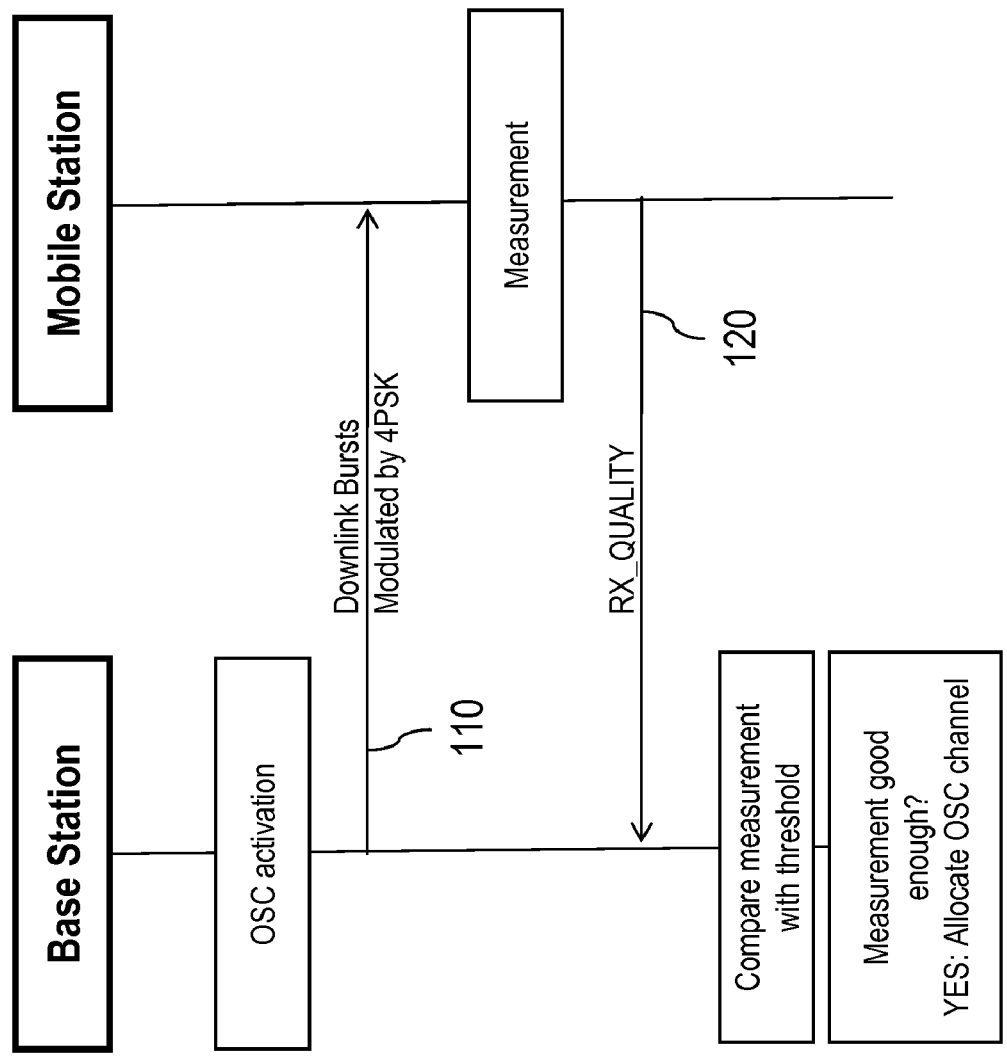

METHOD AND DEVICE FOR TESTING A MOBILE STATION'S CAPABILITY OF PROCESSING AT LEAST ONE SECOND CHANNEL AND COMMUNICATION SYSTEM COMPRISING SUCH DEVICE

The invention relates to a method and to a device for testing a mobile station's capacity of processing at least one second channel and to a communication system comprising such device.

Transmitting two or more (sub-)channels on the same resource unit increases the capacity of a mobile radio system. However, it can lead to performance degradations due to inter (sub-)channel interference. The significance of this degradation depends on the capabilities of the mobile station to receive data or signaling information in the presence of another (sub-)channel allocated to the same resource unit. These capabilities of the mobile station may be unknown to a base station or a base station subsystem.

A typical example is for the Global System for Mobile Communication (GSM) quadrature phase-shift keying (QPSK) or quadrature amplitude modulation (QAM) transmission of two orthogonal sub-channels (OSCs) in one resource unit. At least one of them is intended for a mobile station capable of receiving a single Gaussian minimum shift keying (GMSK) signal. Hence, the base station is not aware whether or not an OSC may be successfully allocated for said mobile station.

The problem to be solved is to overcome the disadvantages stated above and in particular to provide an efficient and improved approach to allow a base station to allocate orthogonal sub channels based on the individual mobile station's capability and/or condition.

This problem is solved according to the features of the independent claims. Further embodiments result from the depending claims.

In order to overcome this problem, a method for testing a mobile station's capability of processing at least two channels in a resource unit is provided, wherein a base station or a network provides a test message to the mobile station;

wherein the mobile station's capability of processing the at least two channels is determined based upon the mobile station's feedback.

Mobile stations comprising advanced receivers, e.g., Single

Antenna Interference Cancellation (SAIC), may be capable of receiving and thus processing OSC. However, mobile stations with SAIC may differ regarding their respective implementation, e.g., some SAIC handsets do not apply a pre-filtering approach that may be important to remove inter-symbol interference (ISI) when processing orthogonal sub channels. Thus, removal of ISI enables a separation of orthogonal sub channels and thus allows receiving the desired signal. Hence, it is beneficial to differentiate between SAIC handsets that are capable of performing said pre-filtering and such handsets that do not provide this feature. Some handsets may apply such pre-filtering even if they do not comprise any Downlink Advanced Receiver Performance (DARP) capability.

Furthermore, the mobile station may be capable of processing orthogonal sub-channels, but not under all radio conditions and in all environments. The approach provided allows determining whether or not a mobile station in its current radio condition or environment can be utilized for OSC processing.

In an embodiment, the mobile station's feedback comprises a measurement report.

Such measurement report conveys data that allow the base station to determine whether the mobile station is capable of processing OSC.

In a further embodiment, said at least two channels are processed in the same resource unit.

According to yet an embodiment, the at least two channels are substantially orthogonal to one another.

It is also an embodiment that the at least two channels are transmitted by the base station with a high degree of orthogonality.

Also, the resource unit may comprise at least one of the following:

a time slot;

a code channel;

a frequency.

It is another embodiment that the test message comprises at least two communication channels, in particular wherein at least one of said two communication channels is a signaling channel.

According to a next embodiment, at least one of the two channels carries data to be decoded by the mobile station.

As a further embodiment, at least one of the two channels does not carry user data and/or signaling information and is in particular active only for a short period or periods of time.

In another embodiment, the base station allocates at least two channels carrying user data or signaling information in the same resource unit in particular if the feedback provided by the mobile station fulfills a predefined condition.

In a next embodiment, the base station initiates a handover of the mobile station to at least a second channel in a further resource unit.

This is in particular done when user data or signaling information is transmitted to a further mobile station if the feedback provided by the mobile station fulfills a predefined condition.

As the base station determines that said mobile station is capable of processing, e.g., OSC, it may be handed over to another orthogonal sub-channel or another mobile station may be handed over to the same resource.

It is also an embodiment that the base station (subsystem) initiates a handover of a further mobile station to at least a second channel in the same resource unit, wherein the first and the second channels are processed by the base station.

Pursuant to another embodiment, said base station prior to providing said test message activates transmission of at least a second channel in the same resource unit to enable the mobile station to measure and provide feedback regarding a reception quality (RX_QUALITY).

According to an embodiment, said test message comprises data bursts. Said data bursts may in particular be modulated via QPSK or 4 QAM.

The problem stated above is also solved by a device comprising a processor unit that is equipped and/or arranged such that the method as described herein is executable on said processor unit.

According to an embodiment, the device is a communication device, in particular a base station or associated with a base station.

It is also an embodiment that said device is a mobile station or it is associated with a mobile station.

The problem stated supra is further solved by a communication system comprising the device as described herein.

Embodiments of the invention are shown and illustrated in the following figure:

FIG. 1 shows a communication diagram between a base station and a mobile station, wherein the base station determines whether or not the mobile station is capable of processing orthogonal sub-channels.

According to FIG. 1, a base station may determine a mobile station's current OSC capability by providing a test message 110 to the mobile station. The mobile station upon reception of such test message may respond with a measurement report 120 regarding a quality of the received signal, namely "RX_QUALITY". Such measurement report can be processed at the base station in order to determine whether or not the particular mobile station is capable of OSC. In particular, the base station may compare the RX_QUALITY value with a threshold: If the RX_QUALITY value is better than such threshold, an OSC is allocated.

The RX_QUALITY report may be a so-called full report comprising active bursts (in particular all such active bursts) during a reporting period or it may be a SUB-report comprising at least one estimated quality value for SACCH and/or predetermined bursts that are active in DTX mode.

The RX_QUALITY may be provided, e.g., as a Frame Error Rate (FER) report and/or as a Bit Error Probability (BEP) report or as estimated values, respectively.

It is to be noted that the base station may be a mobile base station or a base transceiver station (BTS) that works according to a communication standard. The mobile station may in particular be a handset or any device comprising a functionality of a mobile station. The mobile station may in particular be a user equipment (UE).

The test message provided by the base station towards the mobile station may comprise at least some downlink bursts that are modulated, e.g., via 4 QPSK instead of GMSK. If the mobile station is capable of OSC, the test message is received with minimal degradation of quality. A mobile station capable of OSC may in particular apply pre-filtering in order to remove ISI which is beneficial for OSC transmission.

Preferably, the test message conveyed by the base station may be short, but sufficiently long for the mobile station to generate a reliable quality estimation to be sent back to the base station as said measurement report.

The test message may contain as a first channel a data channel to the mobile station carrying data or signaling information. On a second channel, the test message may contain dummy information. The dummy bits on the second channel may not be received by the mobile station, but serve as a placeholder for simulating user data with a structure as used by another user, e.g., comprising a specific training sequence. Both channels are substantially orthogonal to one another in order for the mobile station's receiver being able to separate such channels.

The test message allows the base station to determine whether a mobile station is capable of processing OSC prior to actually allocating an orthogonal sub-channel.

Test messages generated by the base station may in particular comprise at least one of the following in the first channel:

a. Dummy bursts may be provided during a silent period towards the mobile station, wherein advantageously the mobile station also decodes such dummy bursts.
 b. Slow Associated Control Channel (SACCH) blocks and/or Silence Descriptor (SID) blocks are used to provide measured RX_QUALITY SUB-values from QPSK. In this case, the useful signal is not disturbed, but the SACCH may be disturbed.
 c. Active payload data can be used at least partially as test message. However, in such case voice quality degradation may occur if the mobile station is not capable of processing OSC.
 d. A transcoder may process SID blocks as normal voice samples during a testing period in order to provide more "samples" to measure.
 e. One of the two channels may carry dummy bursts that do not contain useful data and that are not decoded by the mobile station.

The test message sent towards the mobile station may utilize, e.g.,

QPSK or 4 QAM;
4 QAM with non-square constellation.

As an option, different levels of power may be utilized during a test period.

The base station may control a transmission power during a test period in particular if there is some headroom to be used in order to boost transmission power in downlink direction. This allows determining a degradation (in dB) by adjusting a transmission power, e.g., to 4 dB higher during said QPSK bursts sent to the mobile station. On the receiver side the quality is assessed and reported back to the base station: If the receiving quality is not degraded when higher power (boost) is used in downlink direction, this may indicate that the receiver's performance may suffice for OSC operation.

Such an approach could minimize an impact for the mobile station to be tested, in particular because a number of bursts that need to be conveyed to the mobile station correspond to a portion of available bursts.

In addition, the base station may test only such mobile station that meets at least one preliminary condition in order to not having all the mobile stations tested.

As an option, the test message may be standardized for the mobile station that is capable of OSC to measure and report on.

The base station may be in a "OSC compatibility determination" mode in order to generate the test message described when the base station controller detects a promising candidate (mobile station) for OSC allocation.

Alternatively, the base station may determine OSC compatibility for, e.g., several ongoing calls and report the most suitable mobile stations to the base station controller.

It is noted that uplink aspects related to determining OSC allocation could be considered either by the base station controller, the base station or both.

Abbreviations:
BTS Base Transceiver Station
DARP Downlink Advanced Receiver Performance
DL Downlink
GMSK Gaussian Minimum Shift Keying
ISI Inter Symbol Interference
OSC Orthogonal Sub-Channel
QAM Quadrature Amplitude Modulation
QPSK Quadrature Phase-Shift Keying
SACCH Slow Associated Control Channel
SAIC Single Antenna Interference Constellation
SID Silence Descriptor

The invention claimed is:

1. A method comprising:
 configuring a test message for transmission to a mobile station over a first channel and a second channel in a single resource unit, wherein the first channel and the second channel are substantially orthogonal;
 evaluating a measurement report comprising information relating to a signal quality of the mobile station's reception of the test message to determine if the signal quality exceeds a predetermined threshold;

if the signal quality exceeds the predetermined threshold, allocating the first channel and the second channel for carrying at least one of user data and control information.

2. The method according to claim 1, wherein the test message is configured so that at least one of the first channel and the second channel carries only dummy information comprising only sufficient data to allow the mobile station to generate a reliable quality estimation.

3. The method according to claim 1, wherein the test message is configured for transmission by a base station and wherein the base station initiates a handover of the mobile station to at least a second channel in a further resource unit.

4. The method according to claim 1, wherein the test message is configured for transmission by a base station and wherein the base station initiates a handover of a further mobile station to at least a second channel in the same resource unit, and wherein the first and the second channels are processed by the base station.

5. The method according to claim 1, wherein the test message is configured for transmission by a base station and wherein the base station prior to providing the test message activates transmission of at least a second channel in the same resource unit to enable the mobile station to measure and provide feedback regarding a reception quality.

6. An apparatus comprising:
at least one processor;
memory storing computer program code which, when executed by the processor, configures the mobile station to at least:
upon receiving a measurement report comprising information relating to a signal quality of a test message received by a mobile station over a first and a second channel in a single resource unit, wherein the first channel and the second channel are substantially orthogonal, determining if the signal quality exceeds a predetermined threshold; and
if the signal quality exceeds a predetermined threshold, allocating the first channel and the second channel for carrying at least one of user data and signaling information.

7. The apparatus according to claim 6; wherein the apparatus is a base station.

8. The apparatus of claim 6, wherein the resource unit comprises one of at least a time slot, a code channel, and a frequency.

9. The apparatus of claim 6, wherein the actions further comprise configuring the test message for transmission to the mobile station over the first channel and the second channel.

10. The apparatus of claim 9, wherein the test message comprises at least one data burst modulated with at least one of quadrature phase shift keying, gaussian minimum shift keying, and 4-quadrature amplitude modulation.

11. The apparatus of claim 9, wherein the base station comprises a transmitter configured to transmit the test message to the mobile station.

12. A mobile station comprising:
a processor:
memory storing computer program code which, when executed by the processor, configures the mobile station to at least:
configure a measurement report in response to a test message received by the mobile station over a first and a second channel in a single resource unit, wherein the first channel and the second channel exhibit a high degree of orthogonality, wherein the measurement report comprises information indicating a signal quality of reception of the test message:
wherein the resource unit comprises at least one of the following: a time slot; a code channel; a frequency;
wherein the first channel is used for communication with the mobile station;
wherein the test message comprises at least one data burst modulated using at least one of quadrature phase shift keying and 4-quadrature amplitude modulation;
wherein the test message comprises at least one of data or control information carried by the first channel; and
wherein the test message comprises dummy information carried by the second channel.

13. A communication system comprising an apparatus according to claim 6 and a mobile station according to claim 12.

14. The mobile station of claim 12, wherein the resource unit comprises at least one of the following: a time slot; a code channel; a frequency.

15. The mobile station of claim 12, wherein the first channel is used for communication with the mobile station.

16. The mobile station of claim 12, wherein the test message comprises at least one data burst modulated using at least one of quadrature phase shift keying and 4-quadrature amplitude modulation.

17. The mobile station of claim 12, wherein the test message comprises at least one of data or control information carried by the first channel.

18. The mobile station of claim 17, wherein the test message comprises dummy information carried by the second channel.

* * * * *